Dec. 30, 1941.                LE ROY N. HERMANN                2,267,976
                                  MIXING VALVE
                        Filed Sept. 6, 1938         2 Sheets-Sheet 1

Inventor:
Leroy N. Hermann.
By:- [signature]
                    Atty.

Patented Dec. 30, 1941

2,267,976

UNITED STATES PATENT OFFICE 2,267,976

MIXING VALVE

Le Roy N. Hermann, Chicago, Ill.

Application September 6, 1938, Serial No. 228,519

24 Claims. (Cl. 236—12)

This invention has to do with a mixing valve and relates particularly to such a valve for mixing fluids of different temperatures and controlling the temperature and volumetric flow of the fluids mixed thereby.

The primary object of the present invention is the provision of an improved automatic faucet or valve device for receiving fluids respectively from relatively hot and cold fluid sources, the device being settable to pre-select the volume and temperature of the mixture discharged therefrom and being operable upon a change in the temperature and/or pressure of fluid received from either of these sources to effect an adjustment so that the temperature and discharge rate of said mixture will remain substantially in accordance with said setting.

Another object of this invention is the provision of a new fluid mixing device as the above wherein a single control member is employed for selectively setting the device in accordance with a desired specified volume and temperature of the fluid mixture discharged therefrom.

Still another object of the present invention is the provision of a fluid mixing device for mixing fluids of different temperature and wherein the structure is so designed and arranged as to prevent cross flow of fluid from either of the fluid supply sources to the other whether the device is in or out of operation.

A further object of the present invention is the provision in a fluid mixing device of a novel type of shut-off valve member operable by a single movement of the control means therefor for closing each of the fluid in-take passages at two places.

An additional object of the present invention is the provision of a novel fluid mixing device including a mixing chamber provided with fluid inlet ports and valve means movable in one manner in response to fluid temperature changes to compensatingly regulate the flow of capacity of said ports and movable in a different manner in response to changes in relative pressure of the inlet fluids to further compensatorily regulate the flow capacity of said ports.

An additional object of this invention is the provision of a mixing valve comprising thermostatically and pressure controlled apparatus for receiving and mixing different temperature fluids, and operable independently of a primary flow-control valve means.

The above and other desirable objects of this invention will become apparent when reading the following description of the preferred embodiment of my invention with reference to the accompanying two sheets of drawings constituting a part of this specification, and wherein.

The same reference characters where appearing in several figures of the drawings and where used hereinafter in the description always designate the same respective parts of the device.

Figure 1:
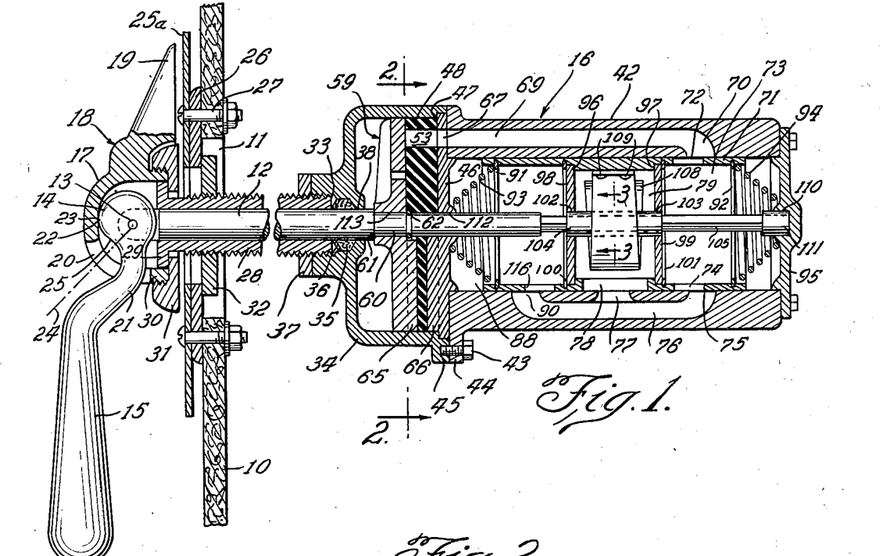
Fig. 1 is a sectional view taken axially through a mixing valve embodying the preferred form of this invention, and taken on the line 1—1 of Fig. 2.

Attention is first invited to Fig. 1 and particularly to a building wall or the like 10 provided with an opening 11. Projecting centrally through the wall opening 11 is a control stem or member 12 which is bifurcated at its forward end. This bifurcated end section of the control member 12 carries a pin 13 which pivotally supports a cam head 14 comprising an end of a control handle 15. The opposite end of the stem 12 projects into a casing generally designated 16 where said stem controls fluid mixing and dispensing instrumentalities hereinafter described in detail.

The cam head 14 is enclosed in a hollow base section 17 of an indicator member 18 having pointer 19. An opening 20 in the base 17 receives the shank 21 of the control handle 15, the opening 20 being sufficiently long to permit pivotal movement of the handle 15 and cam head 14 about the pivot pin 13. This pivotal movement of the cam head 14 causes axial movement of control stem 12 since the control stem 12, as will be explained later, is constantly urged axially forwardly by fluid or water pressure and is arrested by the cam head 14 bearing against the inner surface or the base 17. When point 22 upon the cam head 14 is in registry with the bearing point 23 upon the inner surface of the base 17, incident to the handle 15 being in the position shown in Fig. 1, a section of said cam head of sufficient radius will be disposed between the point 23 and the pin 13 as to force control stem 12 far enough backwardly or to the right as to prevent circulation of either hot or cold water through the device. When the control handle 15 is pivoted forwardly to the position indicated by the dot-dash line 24, a section of shorter radius lying between a point 25 on the cam head 14 and the pivot pin 13 will be aligned with the bearing point 23 thereby permitting the control stem 12 to move forwardly to provide for a maximum circulation of fluid through the device.

The shank 21 of control handle 15 is fitted slidingly into the opening 20 and thus slides along the edges of said opening incident to pivotal movement about the axis of pin 13 while causing endwise movement of the control stem 12. The control stem 12 is also rotatable to adjust the valve mechanism for regulating the temperature of the water discharged therefrom. This rotative movement of control stem 12 is obtained by moving the control handle 15 about the axis of said stem. Meanwhile the shank 21 of said handle bears against the sides of opening 20 thereby causing the pointer 19 of indicator member 18 to move along an arcuate graduated scale (not shown) carried upon the front face of an annular dial member 25a.

The dial member 25a rests against a collar 26 which is mounted upon the front side of wall 10, the dial 25a and the collar 26 being suitably apertured for receiving bolts 27 for holding the same in place upon the wall 10.

An exteriorly threaded sleeve 28 is disposed about the control stem 12. Sleeve 28 has a flange 29 upon its forward end. This flange 29 projects into the hollow base 17 of indicator member 18 where it is held in place by an internally threaded ring 31 which is screwed firmly onto a threaded section 30 of the base 17. A nut 32 upon the threaded portion of sleeve 28 is of sufficient diameter to project into overlapping relation with the collar 26 so that when said nut 32 is turned relatively to the sleeve 28 and thus advanced thereon, the entire unit may be axially adjusted relatively to the wall 10.

The back end of the sleeve 28 is in threaded relation with a recess 33 in the front wall of a cap 34 which covers the front wall 46 of the casing 16. A gland in the bottom of the recess 33 comprises packing material 35 compressed by a conical washer or the like 36 slidably disposed upon the stem 12, the degree of compression of the material 35 by the washer 36 depending upon the distance sleeve 28 is screwed into the recess 33. A lock-nut 37 is provided to maintain a selected adjustment of the sleeve within recess 33. An opening 38 in the back-end of the recess 33 fits closely about control stem 12 and permits both axial and rotative movement of said stem.

The present embodiment of the invention is designed for the mixture and discharge of water obtained respectively from the conventional hot and cold water sources in water pressure systems for household use or the like. Such water is admitted to the device through conduits 39 and 40, Figs. 2 and 5. It will be assumed that conduit 39 leads from a source of normally cold water and that conduit 40 leads from a source of normally hot water. During operation of the device the water which is received through conduits 39 and 40 and mixed is discharged through a conduit 41. The various ducts and passages through which the water received from the conduits 39 and 40 passes on its way through the device prior to reaching the discharge conduit 41, will be described in the ensuing part of the description.

Figures 2, 3, 4:
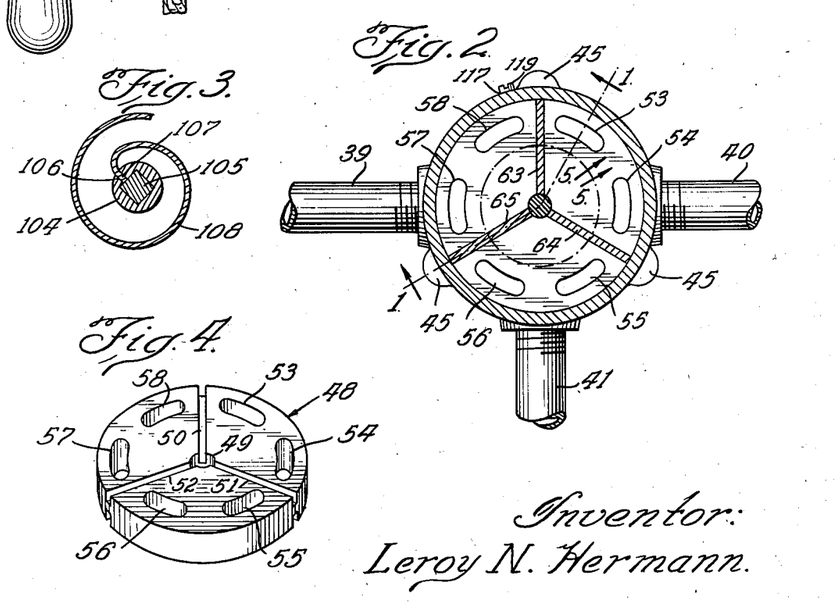
Fig. 2 is a transverse sectional view taken on the line 2—2 of Fig. 1.
Fig. 3 is a fragmentary sectional view taken on the line 3—3 of Fig. 1.
Fig. 4 is a perspective view of a gasket member employed in the device.

The cap 34 is secured to the casing 16 by means of a plurality of stub bolts 43 of which one is shown in Fig. 1. These bolts extend through apertured ears 44 spaced about the front end of side wall 42 and are screwed into threaded recesses in ears 45 respectively registering therewith and disposed about the back end of said cap. Ears 45 are illustrated in Figs. 1 and 2. Front end wall 46 of the casing 16 is seated against a shoulder 47 in the cap 34 and is held in assembly between the cap 34 and the casing side wall 42. Within the cap 34 is a disc-like gasket 48 of rubber or other material capable of withstanding the temperatures of fluid controlled by the device. The perspective view, Fig. 4, of the gasket 48 plainly shows a central opening 49 in said gasket and three radial grooves 50, 51, and 52 formed in one face thereof. Similar grooves extending radially from the opening 49 are provided in the opposite face of the gasket member and in registry with the grooves 50, 51, and 52. Grooves 50 and 51 divide the gasket member into a sector wherein there are openings 53 and 54 extending entirely through the gasket. Similarly, within the sector between the grooves 51 and 52 there are two openings 55 and 56 also extending through the gasket; and openings 57 and 58 extend completely through the gasket in that sector defined by radial grooves 50 and 52.

Also contained within the cap 34 is a disc-like valve shut-off member 59. The member 59 has a central opening which receives a reduced section 60 of the control stem 12. The front side of the shut-off member 59 is held against a shoulder 61 upon the stem 12 by means of a snap-ring 62 which is contracted into a groove therefor circumscribing said stem. Shoulder 61 and the snap-ring 62 constrain the valve shut-off member 59 for axial movement with the stem 12. The back face of the valve shut-off member 59 is smooth and flat with the exception of three radial ribs 63, 64, and 65, Fig. 2, which project respectively into the grooves 50, 51, and 52 in the forward face of gasket member 48. Three radial ribs as 66, Fig. 1, oppositely disposed with respect to the ribs 63, 64, and 65, project forwardly from end wall 46 into the grooves as 50, 51, and 52 upon the back face of gasket member 48. These latter named ribs as 66 hold the gasket member 48 and the valve shut-off member 59 against rotation with the control stem 12 and thus maintain alignment between the openings 53 to 58 inclusive in the gasket member 48 and openings as 67 in the end wall member 46. There is an opening 67 for each of the openings 53 to 48. When the control stem 12 is moved forwardly with the valve shut-off member 59 the flat face section of the member 59 between ribs 63 and 65 thereof will be carried from the forward ends of the openings 57 and 58 and a pocket will be formed between the ribs 63 and 65 and the side wall of the cap 34 in opposed relation therewith, this pocket being effective for providing communication between the openings 57 and 58. At the same time the ribs 63 and 64 together with the opposed side wall section of the cap 34 will effect a pocket providing communication between openings 53 and 54. And the ribs 64 and 65 and the opposed side wall section of the cap 34 will form a pocket providing communication between openings 55 and 56. When the valve shut-off member 59 is in this position water will be permitted to flow through the device, but when said member 59 is moved forwardly as illustrated in Fig. 1 it will be pressed firmly against the front face of the gasket member 48 at the sectors defined by the radial grooves 50, 51, and 52 thereby preventing communication between the complementally paired openings as 57 and 58 and stopping the flow.

Figure 5:
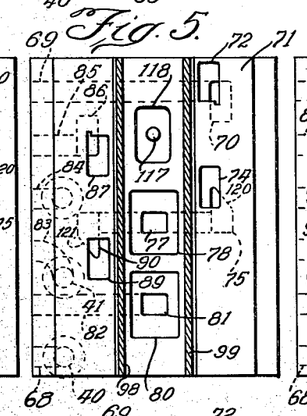
Fig. 5 is an interior development taken on the line 5—5 of Fig. 2.

Fluid from the hot water source entering the device through conduit 40 is first introduced into the device through a duct 68, Fig. 5, extending axially forwardly in the casing side wall 42, thence through one of the openings 67 in the casing end wall 46 and through gasket opening 54, Fig. 2. When the control handle 15 is pulled forwardly to effect forward movement of the valve shut-off member 59 the openings 54 and 53 will be uncovered and permitted to communicate so that the fluid flowing through opening 54 will pass into openings 53 and thence through a casing end wall opening 67 in registry therewith, and through an axially extending duct 69 in the casing side wall 42. The duct 69 opens inwardly of the casing side wall 42 through a port 70 near the back end of said side wall; see Figs. 1 and 5.

When the cylindrical valve member 71 is in the position illustrated in Figs. 1 and 5, the water in duct 69 is permitted to flow from the port 70 through a valve opening 72 into a passage 73 formed in the right end section of the casing. The fluid thus admitted into the passage 73 is permitted to escape through a valve opening 74, a discharge port 75, side wall duct 76, port 77 and opening 78 into a mixing chamber 79 formed within a central section of the cylindrical valve member 71. Referring now to Fig. 5, the fluid thus introduced into the mixing chamber 79 is permitted to flow from such chamber through chamber side wall opening 80 and port 81 in registry therewith in side wall 42. From port 81 the fluid flows into a duct 82 extending axially through a section of side wall 42, thence through an end wall opening 67 in registry with said duct and through opening 55 in gasket member 48, opening 56 of said gasket member, end wall openings 67 which is in registry with the opening 56, discharge duct 83 and thence into the discharge conduit 41.

Cold water introduced into the device through conduit 39 passes through a duct 84, an end wall opening 67 in registry therewith, opening 57 in gasket member 48, opening 58 in said gasket member, a wall opening 67 in registry with the opening 58, side wall duct 85, port 86 at the back end of said duct, opening 87 in the valve member 71, passage 88, Fig. 1, in the casing 16, valve outlet opening 89, discharge port 90, duct 76, port 77 and opening 78 into the mixing chamber. From the mixing chamber 79 the fluid introduced thereinto through the just described circuit reaches the discharge conduit 41 through the circuit previously described with respect to the water reaching the mixing chamber from the hot water source.

A description will now be given of the automatically controlled means for regulating the device so that a desired volume and temperature of water discharged through the conduit 41 may be had despite variations in the temperature and pressure of water supplied through the conduits 39 and 40. Valve member 71 fits closely into the side wall 42 which is cylindrical and is both reciprocable and oscillatable therein. Snap rings 91 and 92 provided interiorly of the valve member 71 provide abutments for the inner ends of coil springs 93 and 94 of which the opposite ends respectively bear against end walls 46 and 95. Springs 93 and 94 tend to maintain the valve member 71 centered lengthwise of the space between the end walls 46 and 95 and thus function to center the valve member 71 after the closing of the valve shut-off member 59. Shoulders 96 and 97 upon the interior periphery of the cylindrical valve member 71 at opposite ends of the mixing chamber 79 serve as stops against which end plates 98 and 99 forming end walls of the mixing chamber 79 are held in place by means of snap rings 100 and 101. The end walls 98 and 99 have openings 102 and 103 into which is inserted a sleeve 104. The sleeve 104 has a cylindrical exterior surface which fits snugly into the openings 102 and 103 to make the mixing chamber fluid-tight at such openings. The sleeve 104 may be press-fitted into the openings 102 and 103 and once assembled in this manner with the mixing chamber end walls remains fixed with respect thereto.

Sleeve 104 is square in cross section on its inner side thereby constraining it to rotate with the square section 105 of control stem 12 but permitting it to slide axially of said stem. In Figs. 1 and 3 the sleeve 104 will be seen to have a slot 106 which receives one end 107 of a helical thermostatic element 108. The opposite end of the element 108 is connected to the valve member 71 in any suitable manner as by means of screws 109.

The end wall 95 of the casing 16 has therein a recess 110 which serves as a bearing for a bearing member 111 which carries the back end of the control stem 12. Front end wall 46 of the casing 16 is provided with an opening 112 for receiving a section of the control stem 12. Said control stem 12 is also received by the opening 49 in the gasket member 48 as well as the opening 113 in the valve plate 59.

Operation of the device is as follows:

When the valve is installed for operation the conduits 39 and 40 will respectively supply sources of cold and hot water under pressure. While the control handle occupies the position shown in Fig. 1 the cam head 14 will bear against the base 17 of the indicator 18 to force the control stem 12 and the valve plate 59 rearwardly whereby the latter, incident to projecting its ribs 63, 64, 65 into radial grooves 50, 51, 52 of the gasket 48, will force its rear face flatly against the front face of said gasket member. In this manner the openings 57 and 54, Fig. 2, of the gasket member 48 and which are in respective communication with the conduits 39 and 40 will be closed by the plate 59 as will the openings 58 and 53. There will thus be a double closure of the paths of flow for both the hot and the cold water. That is, the cold water which when the plate 59 is moved forwardly flows from the conduit 39, through duct 84, Fig. 5, opening 57 and then through opening 58, will have its path closed both at the opening 57 and the opening 58. Likewise, the path for the hot water which when the plate 59 is moved forwardly flows from conduit 40 and thence through duct 68, Fig. 5, opening 54 and then through opening 53 will be closed at the point of emergence from opening 54 and the point of ingress into opening 53. While the valve plate 59 is disposed, rearwardly in its closing position said plate will be constantly urged forwardly by the pressure of water directed thereagainst through openings 54 and 57. Therefore, when the control handle and the cam head 14 are pivoted counter-clockwise this water pressure directed through the openings 54 and 57 will force the plate 59 and the control stem 12 forwardly. The amount of water that may then flow through the openings 54 and 57 may be regulated by the amount of counter-clockwise movement of the control handle 15 which determines the amount of forward movement of the valve plate 59. A maximum amount of water will be permitted to flow from opening 57 into opening 58 and from opening 54 into opening 53 when the control handle 15 is pivoted to the limit indicated by the dot-dash line 24.

Hot water, when the valve plate 59 is moved forwardly a selected amount, will flow rearwardly through gasket opening 53, the end wall opening 67 in registry with the opening 53, side wall duct 69 and through the port 70, Figs. 1 and 5, and the valve opening 72 into the passage 73 formed between the mixing chamber 79 and the valve chamber end wall 95. At the same time, cold water flows rearwardly through gasket opening 58, thence through an opening 67 in the end wall 46, duct 85, Fig. 5, port 86 and the valve opening 87 into the passage 88 formed between the forward end wall 46 and the mixing chamber 79. It will be assumed that the pressures of the hot and cold water supplied to the device are equal while the valve member 71 is centered endwise of the valve chamber 42 so that the cross sectional areas of the registered or overlapping sections of hot water port 70 and cold water port 86 respectively with the valve openings 72 and 87 associated therewith are equal and while the registered or overlapping sections of discharge ports 75 and 90 respectively with the valve openings 74 and 89 associated therewith are equal. When this condition exists, the pressure of fluid in the passages 73 and 88 acting against the end walls 99 and 98 of the mixing chamber 79 will be opposite and equal and consequently there will be no tendency for the mixing chamber and the valve member 71 carrying the same to move axially. From the passages 73 and 88 hot and cold water is discharged into the duct 76 from which such water is introduced into the mixing chamber 79.

While in the mixing chamber 79 the different temperature fluids are thoroughly mixed and brought in contact with the thermostatic element 108 prior to being discharged through opening 80 in the side wall of the valve member 71 and the port 81 which is at one end of the duct 82 in chamber side wall 42. The discharge water is carried through the duct 82, thence through an opening 67 in end wall 46, gasket opening 55, gasket opening 56, another of the openings 67 in the end wall 46, duct 83 and lastly outwardly through discharge conduit 41.

Prior to permitting circulation of water through the device by the forward movement of the shut-off plate 59, the operator may preselect the desired temperature of water to be discharged through the conduit 41. Such pre-selection of water temperature, is made by rotating the control stem 12 by means of the handle 15 incident to moving the pointer 19 along the graduated scale on the dial 25a. The pointer 19 is set opposite the desired temperature indicated by the scale on dial 25a. This rotation of the control stem 12 rotates the sleeve 104 and the relatively stiff thermostatic element 108 thereby causing rotation of the cylindrical valve member 71 within the valve chamber wall 42. In this manner the valve openings 72, 74, 87, and 89 are so adjusted with respect to the ports 70, 75, 86, and 90 that the amount of overlap of these valve openings with their respective ports will result in correct apportionment of the water received from the hot and cold sources to get the desired temperature of water discharged through the conduit 41, providing the temperature of the two sources of water is normal. Should the water at the hot water source be cooler than normal, the resulting mixture in the chamber 79 would initially be cooler than that indicated by the pointer 19 upon the dial 25a, but the thermostatic element 108 will respond immediately as follows to correct this discrepancy. The relatively cool water in the mixing chamber 79 causes the element 108, while reacting against the sleeve 104 and the control stem 12, to rotate the valve member 71 clockwise, Fig. 3. An examination of Fig. 5 will show that such clockwise rotation of the valve member 71 will increase the opening of hot water port 70 while decreasing the opening of cold water port 86. Simultaneously with this increase in inlet capacity of passage 73 and decrease in inlet capacity of passage 88, the valve member shifts the valve openings 74 and 89 so as to increase the discharge capacity of passage 73 and decrease the capacity of the passage 88. In this fashion, the pressures within the passages 73 and 88 remain balanced although the amount of hot water carried through passage 73 is increased while the amount of cold water carried through passage 88 is decreased. No endwise movement of the valve member 71 occurs. However, with the increased percentage of hot water introduced into the mixing chamber 79, the temperature of the water in such chamber will be increased and the temperature of the water discharged through the conduit 41 will likewise be substantially increased to that temperature indicated by the pointer 19 upon the dial 25a. If the temperature of the hot water supply should later increase, this setting of the valve member 71 will be improper since the greater quantity of water from the hot water source now being mixed with the smaller quantity of water from the cold water source would result in a mixture of too high temperature. But when the temperature of the water in the mixing chamber 79 surpasses that indicated by the pointer 19 upon the dial 25a, the thermostatic element 108 will operate in the opposite direction as hereinabove described thereby rotating the valve member 71 counter-clockwise to decrease the inlet and discharge capacities of hot water passage 73 by partial closing of ports 70 and 75 and to increase the inlet and discharge capacities of passage 88 by partial opening of ports 86 and 90. The amount of rotation of valve member 71 is a function of the temperature variation of the mixture in the chamber 79.

Figures 6, 10:
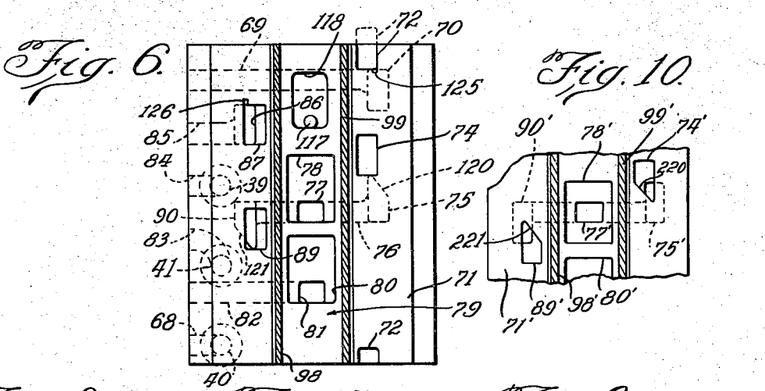
Fig. 6 is a view taken similarly to Fig. 5, and illustrating the valve means when moved to an extremity of adjustment providing for a maximum flow of cold fluid and no flow of hot fluid.
Fig. 10 is a fragmentary view taken similarly to Fig. 5 but illustrating valve and port openings modified in shape.

Fig. 6 illustrates the relative position of the valve member 71 and the valve chamber side wall 42 when only cold water from the cold water source can circulate through the device. Such condition may be obtained by setting the pointer 19 to the low temperature limit indicated by the scale on dial 25a and thereby rotating the control stem 12, the sleeve 104, the thermostatic element 108 and the valve member 71 counter-clockwise, Fig. 3, until the valve openings 87 and 89 are in the position shown in Fig. 6.

Figure 7:
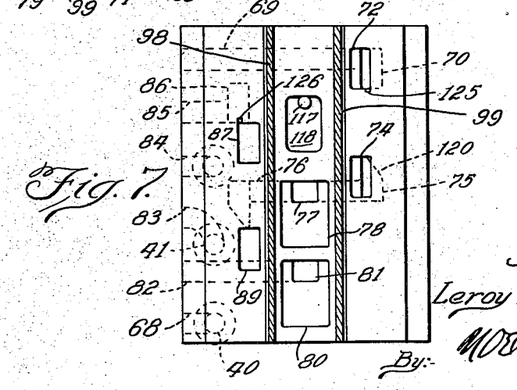
Fig. 7 is a view taken similarly to Fig. 5 and illustrating the valve means when moved to an extremity of adjustment opposite to that illustrated in Fig. 6 and providing for a maximum flow of hot fluid and no flow of cold fluid.
Figure 8:
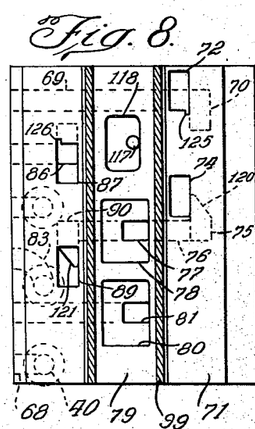
Fig. 8 is a view taken similarly to Fig. 5 but illustrating the valve means at an extreme limit of adjustment assumed because of complete failure of pressure at the source of cold fluid for admittance into the device.

Valve member 71 is shown in Fig. 7 at another extreme limit of adjustment, opposite to that shown in Fig. 6. When in this position only the hot water inlet and outlet ports 70 and 75 are uncovered so water can flow only through the hot water passage 73. Ports 86 and 90 for the cold water passage 88 are closed. This position of the valve member 71 may be obtained by rotating the indicator member 18 until the pointer 19 is set to the extreme hot limit indicated by the scale upon the dial 25a.

Rotative movement of the valve member 71 beyond either of the extreme positions shown in Figs. 6 and 7 is prevented by a pin 117 abutting against the edges of an opening 118 therein. Pin 117 may be screw threaded into a suitable aperture provided in the side wall 42 of the casing 16, the outer end of the pin 117 including a grooved head 119 to facilitate its being screwed into place.

In addition to valve adjustments necessitated by changes in temperature of the water received from the different sources, other adjustment is necessary to compensate for the relative changes in pressure of water received from such sources. Sudden pressure changes cause sudden changes in the proportioning of the mixture and temperature of the mixture. Substantially instantaneously operating means must be provided for adjusting the device to compensate for these sudden temperature variations and this is accomplished by axial movement of the cylindrical valve member 71. In Fig. 5 the valve 71 is illustrated in a normal operating position. If while operating under conditions wherein the valve 71 is arranged as shown in Fig. 5, there should be a sudden pressure drop in the hot water source such as is frequently caused by the opening of an outlet at another point in the hot water supply line, the pressure in passage 73 would drop. Because of the relatively great pressure then existing in passage 88, the valve member 71 would be moved axially to the right and incident to this movement to the right the admittance capacity and the discharge capacity of passage 73 are increased so that the ratio of the volume of cold water carried through passage 88 into the mixing chamber 79 to the amount of water carried through the passage 73 into said mixing chamber will remain substantially the same as before the decrease in pressure of the water at the hot water source. In other words, while the inlet and discharge capacities of the passage 73 have been increased the pressure tending to force water through this passage has decreased so that the amount of water actually discharged through the port 75 will be slightly less than before the pressure drop. And also in the cold water passage 88 where the pressure remained constant, the amount of water discharged through the port 90 is decreased by the diminution of the inlet and outlet capacities of said passage. This adjustment of valve member 71 is instantaneous with the pressure change, and although the quantity of discharge is slightly decreased, the quantity ratio of hot and cold water remains the same. As soon as the normal pressure is restored at the water sources the original discharge rate will be resumed. The discharge quantity is variable at any time by rotating the control handle 15 about the axis in pin 13.

Figure 9:
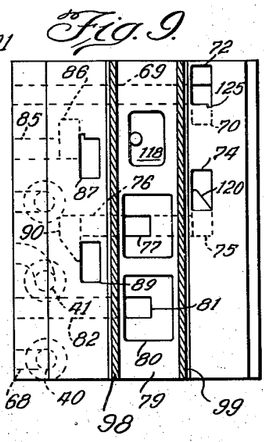
Fig. 9 is a view similar to Fig. 8 but illustrating the valve means at the opposite extreme limit of adjustment assumed because of complete failure of pressure at the source of hot fluid for admittance into the device.

Fig. 9 illustrates the valve member 71 at an extreme limit of movement caused by an entire failure of water pressure at the hot water source. Under such conditions no water pressure would exist in passage 73 thereby permitting the pressure of water in passage 88 to force the valve member to its extreme right, the limit of movement being determined by the pin 117 abutting against an edge of the opening 118. In the normal operation of the device, however, there will be no complete pressure failure of either the hot or cold water. When there is but a partial decrease in the pressure at the hot water source, for example, it will be desired for the valve member 71 to move to the right the desired compensatory distance and then stop in its movement. This action of the valve is obtained by providing ports 75 and 90 with angularly disposed edges 120 and 121.

In the present device the primary means for controlling and limiting the axial movement of valve member 71 operates by regulating the pressure in the passages 73 and 88 by virtue of angularly arranged edges 120 and 121 of discharge ports 75 and 90. This self-regulatory feature of the device will now be described.

It will be assumed while the device is in use with the valve member 71 positioned as shown in Fig. 5, that a relative increase of pressure occurs in passage 88 because of a relative pressure increase at the cold water source. If the valve openings were permitted to remain unchanged this condition of pressure would cause too much cold water to flow and the mixture would be cooler than desired. As a result of this relative increase of pressure the valve member 71 will begin to move rearwardly or to the right, Figs. 1 and 5. During this movement the inlet capacity of passage 73 will be increased and likewise the discharge capacity of said passage will be increased, but because of the angular arrangement of the edge 120 of discharge port 75 the increase in the discharge capacity will be less than the increase in the inlet capacity. Therefore, as the valve member 71 advances toward the right, there will be an increase of pressure in passage 73 resisting further movement of the valve member. Referring now to the passage 88, during such rearward movement of the valve member 71, there will be a decrease in the inlet and discharge capacities of said passage, but since the edge 121 of discharge port 90 is arranged angularly, as shown, the decrease in discharge capacity of said passage 88 per unit of axial movement of said valve member will be less than the inlet capacity decrease per unit of movement of said valve member. With the discharge capacity of port 90 decreasing at a less rapid rate than the decrease of inlet capacity of the port 86 during rearward movement of the valve member the pressure in passage 88 will correspondingly decrease. The flow capacity of the passage 88 initially having the relatively higher pressure will be decreased while the flow capacity of the passage 73 intially having the relatively lower pressure will be increased so as to maintain substantially constant the aggregate volume and the desired relative proportion of hot and cold water conducted into the mixing chamber 79. Eventually the decreasing force of pressure in passage 88 combined with the decreasing force of spring 93 becomes equal to the opposing and increasing force of the pressure in passage 73 combined with the increasing force of spring 94 at which time the valve member 71 comes to rest. Inasmuch as the springs 93 and 94 are capable of exerting but a small force upon the valve member 71, since their primary function is to center said valve member subsequent to each use of the device, the pressure in passages 73 and 88 is the principal source of energy for imparting endwise movement of said valve member, although the angularity of the edges 120 and 121 of the ports 75 and 90 will be such as to function complementally with the springs 93 and 94 in determining the amount of such movement.

The effect of the angularly arranged edges 120 and 121 of the ports 75 and 90 has been explained under conditions where there has been a relative increase of pressure in passage 88. These ports also operate for controlling movement of the valve member 71 in the opposite direction when there has been a relative increase of pressure in passage 73. In this latter case, valve member 71 will begin forward movement and during this movement the inlet and discharge capacities of passage 73 will decrease while the inlet and discharge capacities of passage 88 increase. The discharge capacity of port 75 decreases less rapidly than the inlet capacity of port 70 whereby the pressure in passage 73 will decrease. The discharge capacity of passage 88 increases at a less rapid rate than the inlet capacity thereof so that the pressure in said passage will increase. After the valve member 71 has moved the required distance, the pressures in the passages 88 and 73 as modified by the springs 93 and 94 will strike a balance and valve movement will cease.

From the foregoing it will be understood that the present design of the inlet and outlet ports for the passages 73 and 88 is such that rotative movement of the member 71 can take place for regulating the temperature of the water mixture without disturbing the relative pressure in said passages. In other words, a mere change in temperature of the water from one source without a change in pressure will simply cause the thermostat element 108 to rotate the cylinder 71 whereby both the inlet and outlet capacities of the passages are modified so the pressure in each passage remains substantially the same although there is a change in the volume of water passing through them. But because of the pressure stability no endwise movement of the member 71 occurs, which, if it did occur independently of pressure changes at the water sources, would introduce inaccuracy into the rotary temperature responsive adjustment. Thus the automatic rotary adjustment of the member 71 for temperature fluctuations and the automatic endwise adjustment of said member for pressure fluctuations are obtained independently of one another by use of the same valve means. When the cylinder is caused to move endwise to compensate for a relative pressure increase in one of the passages, the pressure in said passages is modified to become equalized so the cylinder will be stopped instead of moving to an extreme limit toward which movement may be started.

Attention is again directed to Fig. 6 where the valve member 71 is illustrated in an extreme position of rotation providing for circulation only of cold water through the device. Discharge port 75 is completely shut off so that water within passage 73 cannot flow into the mixing chamber 79. The notch 125 in an edge of valve opening 72 is permitted, however, to register with the port 70 so the passage 73 will have communication with the hot water source and thereby have maintained therein a pressure opposing the pressure of the cold water in passage 88 and in this manner prevent backward endwise movement of the valve member. It will be seen in Fig. 7 that the notch 126 in the valve opening 87 registers with port 86 when the valve member 71 is rotated to the extreme position for permitting the flow of only hot water, and during this period of operation the notch 126 provides communication between the passage 88 and the cold water source so that pressure will be maintained in the passage 88 in opposition to the pressure in passage 73 thereby preventing forward movement of valve member 71.

The device will operate as above described to compensate for pressure fluctuations by regulating endwise movement of the valve member 71 if the diagonal edges 120 and 121 of ports 75 and 90 are provided on the valve openings 74 and 89 and said ports are simply rectangular in cross sectional area. Such a structure is illustrated in Fig. 10 where the parts corresponding to those in Fig. 5 are indicated by the same reference character with a prime added. Diagonal edges on the valve openings 74' and 89' are respectively designated 220 and 221. This modified structure has the advantage of having the more complicated openings with diagonal edges upon a removable part where they are more accessible for machining when initially formed and for later alteration of their shape if desired. Also the operating characteristics of such a valve may be easily changed by replacing valve members as 71' with other valve members in which the diagonal edges 220 and 221 of openings 74' and 89' are disposed at different degrees of angularity.

The circumferential edges of the ports as 75 and of the valve openings as 74 may be regarded as transverse edges since they are disposed transversely of the axial wall elements of the cylindrical mixing chamber whereas the edges as 120 and 220 of these ports and openings that intersect such transverse edges may be regarded as angularly arranged edges since they are disposed obliquely to the axial wall elements of said mixing chamber. Various arrangements of angularity or obliqueness of the intersecting edges upon either the inlet ports or openings or the exhaust ports or openings may be designed for causing the amount of overlap of the discharge openings and ports to change less than the amount of overlap of the inlet openings and ports per unit of axial movement of the mixing chamber.

I am aware that the principles of my invention can be embodied in other structural forms. Consequently there is no intention that the invention shall be limited to the form hereinabove described with reference to the drawings, but that such invention shall be coextensive with the appended claims.

I claim:

1. In a pressure regulated valve, a casing having a passage for fluid, valve means operable to control both the admittance and discharge of fluid into and from said passage, and valve actuating means responsive to changes in pressure of fluid in said passage and being thus operable upon an increase of such pressure to actuate said valve means to diminish the admittance capacity for said passage and also to diminish the discharge capacity therefor but to a lesser degree.

2. In a pressure regulated valve, a casing having a passage for fluid, valve means operable to control both the admittance and discharge of fluid into and from said passage, and valve actuating means responsive to changes in pressure of fluid in said passage and being thus operable upon a change in said pressure to actuate said valve means to effect an inverse change in both the admittance and discharge capacities of said passage while effecting such change to a lesser degree in the discharge capacity.

3. In a pressure regulated valve, a casing having a passage for fluid and inlet and discharge ports for said passage, valve means for regulating the degree of opening and closing of said ports, pressure responsive control means for said valve means, said valve control means being disposed for subjection to the pressure of fluid in said passage and being operable incident to an increase of pressure in said passage to actuate said valve means for effecting at least a partial closing of said ports while closing the inlet port to a greater degree than the discharge port.

4. In a pressure regulated valve, a casing having a passage for fluid and inlet and discharge ports for said passage, valve means for regulating the degree of opening and closing of said ports, pressure responsive control means for said valve means, said valve control means being disposed for subjection to changes in fluid pressure in said passage and being operable responsively to an increase of pressure in said passage to actuate the valve means for effecting at least a partial closing of said ports and operable responsively to a decrease of pressure in said passage to actuate the valve means for effecting at least a partial opening of said ports, and said valve means being so constructed and arranged with respect to said ports that the percentage of change in flow capacity of the inlet port exceeds the percentage of change in the flow capacity of the discharge port while said valve means is actuated for effecting either a closing or an opening of said ports.

5. In a pressure controlled valve, a casing having a passage for fluid and inlet and discharge ports for said passage, valve means having an inlet opening normally in overlapping relation with said inlet port and a discharge opening normally in overlapping relation with said discharge port, pressure responsive valve control means disposed for subjection to the pressure of fluid in said passage and operable to move said valve means in opposite directions in response to pressure changes of fluid in said passage to change the amount of overlap of said ports and their respectively associated openings inversely to a change in such pressure, and at least one of said ports having an edge section arranged angularly to the line of movement of said valve means as an expedient to causing a relatively less change in the amount of overlap of the discharge port and its associated opening than the change in the amount of overlap of the inlet port and its associated opening pursuant to a movement of said valve means in either direction.

6. In a valve containing a passage for a fluid that is susceptible to variation in both pressure and temperature and having inlet and discharge ports for said passage, valve means mounted for reversible rectilinear movement and for reversible rotative movement in said passage, said valve means having an inlet opening normally in overlapping relation wtih said inlet port and a discharge opening normally in overlapping relation wtih said discharge port, pressure responsive valve control means disposed for subjection to the pressure of fluid in said passage and operable to impart rectilinear movement to said valve means in response to pressure changes in said passage to change the amount of overlap of said openings with their respective ports inversely to a change in such pressure, thermostatic means in operable relation with said valve means for imparting rotative movement thereto, said thermostatic means being disposed for encountering said fluid and being operable in response to a temperature variation thereof to rotate said valve means for changing the amount of overlap of said openings and their respective ports as a function of such temperature variation.

7. In a valve for controlling the flow and mixture of fluids of different temperature, a casing having opposite fluid conducting sections respectively for said fluids, each of said sections having an inlet port and an exhaust port, a mixing chamber in said casing and reversibly movable rectilinearly between said fluid conducting sections, said mixing chamber presenting opposite of its walls for respective subjection to the fluid in said sections to be urged in opposite directions along the axis of its path of rectilinear movement by the pressure exerted by such fluid, duct means providing communication between each of said exhaust ports and the interior of said mixing chamber, and valve means connected with said mixing chamber for movement therewith, said valve means comprising inlet openings respectively normally in overlapping relation with the inlet ports of said fluid conducting sections and exhaust openings respectively normally in overlapping relation with the exhaust ports of said fluid conducting sections, said mixing chamber upon a relative increase of fluid pressure in one of said sections being moved toward the other of said sections, and the openings of said valve means in said one passage being so constructed and arranged with respect to their respective ports that the overlap of each with its respective port is decreased with such movement and the decrease in the overlap with the inlet port is the greater.

8. In a valve for controlling the flow and mixture of fluids of different temperature, a casing having opposite fluid conducting sections respectively for said fluids, each of said sections having an inlet port and an exhaust port, a mixing chamber in said casing and reversibly movable rectilinearly between said fluid conducting sections, said mixing chamber presenting opposite of its walls for respective subjection to the fluid in said sections to be urged in opposite directions along the axis of its path of rectilinear movement by the pressure exerted by such fluid, duct means providing communication between each of said exhaust ports and the interior of said mixing chamber, valve means connected with said mixing chamber for movement therewith, said valve means including parts respectively associated with said ports for regulating their flow capacity upon movement of said parts with said mixing chamber, the regulating capacity of the parts associated with the inlet ports being greater than that of the parts associated with the exhaust ports, said mixing chamber being movable by the pressure of fluid in either of said fluid conducting sections in which a relative pressure increment occurs toward the other of said sections, and the valve parts for the ports of each section being disposed for decreasing the flow capacity of their ports upon movement of the mixing chamber toward the other section and for increasing the flow capacity of their ports upon movement of the mixing chamber in the opposite direction.

9. A mixing valve comprising a casing having oppositely disposed passages respectively for hot and cold fluid and each passage having an inlet port and a discharge port, a mixing chamber in said casing and having intake and outlet openings, there being ducts in said casing providing communication between said discharge ports and said mixing chamber through the intake opening of said chamber, valve means connected with said chamber, said valve means including inlet openings respectively normally in overlapping relation with the inlet ports of said passages and discharge openings respectively normally in overlapping relation with the discharge ports of said passages, said mixing valve being mutually exposed to said passages for subjection to the pressure of fluid therein and being controllable by such pressure to move toward either of said passages wherein a relative decrease in pressure occurs, said mixing chamber also being rotatable, a manual control member extending into said mixing chamber, and a thermostatic element in said chamber and providing a connection between said control member and said chamber for imparting rotative movement to said chamber and hence to said valve means while reacting against said control member, and the openings in said valve means being so shaped and arranged relatively to their respective ports that upon said movement of the mixing chamber toward either of said passages the amount of overlap of the valve openings with the ports in that passage will be increased as a function of the amount of such movement whereas the amount of overlap of the valve openings with the ports in the other passage will be decreased as a function of the amount of such movement while the amount of change in said overlap of the inlet openings in each of said passages exceeds that of the exhaust openings respectively therein, and the openings in said valve means being so further shaped and arranged relatively to their respective ports that upon rotative movement of said mixing chamber and hence of said valve means in the direction determined and effected by said thermostatic element when subjected to a fluid mixture of increased temperature the amount of overlap of the valve openings in the hot fluid passage with their respective ports will be decreased whereas the amount of overlap of the valve openings in the cold fluid passage with their respective ports will be increased.

10. A mixing valve device comprising a cylindrical casing having within its side wall a pair of axial inlet ducts respectively for hot and cold fluid, a pair of axial feeder ducts respectively for hot and cold fluid, an axial transfer duct, an axial mixture feeder duct for mixed hot and cold fluid and an axial mixture discharge duct for mixed hot and cold fluid, all of which ducts open at an end of the side wall at one end of said casing with the exception of the transfer duct, said casing also having passages respectively for hot and cold fluid in opposite ends thereof and each passage being provided with an inlet port and an outlet port, the inlet ports of said passages being respectively communicative with the feeder ducts and the outlet ports of said passages being communicative with the transfer duct, a primary valve structure including sections for conductively connecting the open ends of the hot fluid inlet duct, the cold fluid inlet duct and the mixture feeder duct respectively with the hot fluid feeder duct, the cold fluid feeder duct and the mixture discharge duct, said primary valve structure also including a valve shut-off member movable axially against the end of said casing in closing relation with the ends of said ducts, a rotatable and axially movable valve control stem having a section operably carrying said valve shut-off member and a section extending axially into said valve casing, a cylindrical mixing chamber in said valve casing and having an opening therein communicating with said transfer duct of the casing and another opening communicating with said mixture feeder duct, said axially extending section of the valve stem also extending into said mixing chamber, valve means connected with said mixing chamber and having openings respectively disposed in overlapping relation with said ports, said mixing chamber being rotatable in one direction to alter the overlap of said openings and ports to increase the resistance of the device to the flow of hot fluid therethrough while decreasing the resistance of the device to the flow of cold fluid therethrough and rotatable in the opposite direction to alter the overlap of said openings and ports to decrease the resistance of the device to the flow of hot fluid therethrough while increasing the resistance of the device to the flow of cold fluid therethrough, a thermostatic element in said mixing chamber and connected with said chamber and with the section of the valve stem therein, said thermostatic element serving as a mechanical connecting means between said stem and the mixing chamber whereby the latter may be rotated by manual rotation of said stem to selectively set said valve means, and said element being so arranged between said stem and said chamber that when subjected to fluid of increased temperature the distortion of said element effects rotation of said chamber in said one direction and that when subjected to fluid of decreased temperature the distortion of said element effects rotation of said chamber in the opposite direction.

11. A mixing valve device comprising a cylindrical casing having within its side wall a pair of axial inlet ducts respectively for hot and cold fluid, a pair of axial feeder ducts respectively for hot and cold fluid, and an axial transfer duct, all of which ducts open at an end wall at one end of said casing with the exception of the transfer duct, said casing also having passages respectively for hot and cold fluid in opposite ends thereof and each passage being provided with an inlet port and an outlet port, the inlet ports being respectively communicative with the feeder ducts and the outlet ports being communicative with the transfer duct, a primary valve structure including sections for conductively connecting the open ends of the hot fluid inlet duct and of the cold fluid inlet duct respectively with the open ends of the hot fluid feeder duct and of the cold fluid feeder duct, said primary valve structure also including a valve shut-off member movable axially against the end of said casing in closing relation with the ends of said ducts, a rotatable and axially movable valve control stem having a section operably carrying said valve shut-off member and a section extending axially into said valve casing, a cylindrical mixing chamber in said valve casing and having an intake opening therein communicating with said transfer duct of the casing and having another opening for the discharge of fluid mixture therefrom, said axially extending section of the valve stem also extending into said mixing chamber, valve means connected with said mixing chamber and having openings respectively disposed in overlapping relation with said ports, said mixing chamber being rotatable in one direction to alter the overlap of said openings and ports to increase the resistance of the device to the flow of hot fluid therethrough while decreasing the resistance of the device to the flow of cold fluid therethrough and rotatable in the opposite direction to alter the overlap of said openings and ports to decrease the resistance of the device to the flow of hot fluid therethrough while increasing the resistance to the flow of cold fluid therethrough, a thermostatic element in said mixing chamber and connected with said chamber and with the section of the valve stem therein, said thermostatic element serving as a mechanical connecting means between said stem and the mixing chamber whereby the latter may be rotated by manual rotation of said stem to selectively set said valve means, and said element being so arranged between said stem and said chamber that when subjected to fluid of increased temperature the distortion of said element effects rotation of said chamber in said one direction and that when subjected to fluid of decreased temperature the distortion of said element effects rotation of said chamber in the opposite direction.

12. In a pressure and temperature regulated mixing valve, a casing containing a passage having an inlet port and an outlet port, a cylindrical mixing chamber supported for both rotative and axial movement in said casing, said mixing chamber having intake and exhaust openings, duct means providing communication between said outlet port and said intake opening, valve means connected with said mixing chamber and including openings of which quadrant sections are normally respectively in overlapping relation with quadrant sections of said ports so that rotation of the mixing chamber in one direction decreases the amount of such overlap whereas rotation of said mixing chamber in the opposite direction increases the amount of such overlap and that axial movement in one direction decreases the amount of such overlap whereas axial movement in the opposite direction increases the amount of such overlap, a force reaction member in said mixing chamber, a thermostatic element in said mixing chamber and connected between said reaction member and said chamber, said thermostatic element being operable when subjected to fluid of increased temperature to rotate said chamber in said one direction while reacting against said reaction member and similarly operable when subjected to fluid of decreased temperature to rotate said chamber in the opposite direction, said chamber also having an end section disposed for subjection to the pressure of fluid in said passage and being thus movable in said one axial direction upon an increase of fluid pressure in said passage, and means for urging said mixing chamber in the opposite direction.

13. The combination set forth in claim 12, and wherein said reaction member is a valve control stem extending axially into said mixing chamber and wherein said thermostatic element serves as a connecting means through which the valve stem is operable for rotatively setting said mixing chamber and hence said valve means according to a pre-selected temperature of fluid mixture in said chamber.

14. In a pressure and temperature regulated mixing valve, a casing containing a passage having an inlet port and an outlet port, said casing also containing a transfer duct which leads from said outlet port and a feeder duct which leads to said inlet port, a primary valve structure including an axially movable and rotatable valve stem extending into said casing and volume control means connected with said valve stem and operable by said stem upon axial movement thereof to regulate the flow of fluid through said feeder duct, a cylindrical mixing chamber supported for both rotative and axial movement in said casing, said mixing chamber having intake and exhaust openings and being communicative with said passage through said intake opening, said transfer duct and said outlet port, valve means connected with said mixing chamber and including openings of which quadrant sections are normally respectively in overlapping relation with quadrant sections of said inlet and outlet ports so that rotation of the mixing chamber in one direction decreases the amount of such overlap whereas rotation of said mixing chamber in the opposite direction increases the amount of such overlap and that axial movement of said mixing chamber in one direction decreases the amount of such overlap whereas axial movement of said mixing chamber in the opposite direction increases the amount of such overlap, said valve stem having a section extending axially into said mixing chamber, a thermostatic element in said mixing chamber and connected non-rotatively to said chamber and to said section of the valve stem to facilitate rotative adjustment of said chamber by rotation of said valve stem, said thermostatic element being operable when subjected to fluid of increased temperature to rotate said chamber in said one direction while reacting against said valve stem and similarly operable when subjected to fluid of decreased temperature to rotate said chamber in the opposite direction, said chamber also having an end section disposed for subjection to the pressure of fluid in said passage and being thus movable in said one axial direction upon an increase of fluid pressure in said passage, and means for urging said mixing chamber in the opposite axial direction.

15. In a pressure and temperature regulated mixing valve, a casing containing a passage having an inlet port and an outlet port, a cylindrical mixing chamber supported for both rotative and axial movement in said casing, said mixing chamber having intake and exhaust openings, duct means providing communication between said outlet port and said intake opening, valve means connected with said mixing chamber and including openings of which substantially quadrant sections are normally respectively in overlapping relation with substantially quadrant sections of said ports, each of said overlapping sections of said ports and valve openings having a transverse edge with respect to the axial wall elements of said cylindrical mixing chamber and an edge intersecting such normal edge, said ports and openings being so relatively disposed that rotation of the mixing chamber in one direction decreases the amount of such overlap whereas rotation of said mixing chamber in the opposite direction increases the amount of such overlap and that axial movement of said mixing chamber in one direction decreases in the amount of such overlap whereas axial movement in the opposite direction increases the amount of such overlap, a force reaction member in said mixing chamber, and a thermostatic element in said mixing chamber and connected between said chamber and said reaction member, said thermostatic element being operable when subjected to fluid of increased temperature to rotate said chamber in said one direction while reacting against said reaction member and similarly operable when subjected to fluid of decreased temperature to rotate said chamber in the opposite direction, said chamber also having an end section disposed for subjection to the pressure of fluid in said passage and being thus movable in said one axial direction upon an increase of fluid pressure in said passage, and at least one of said intersecting edges of said ports and valve openings being arranged obliquely to the axial wall elements of said mixing chamber to cause the change in overlap between the inlet port and its associated valve opening to exceed the change in overlap of the outlet port and its associated valve opening per unit of axial movement of said mixing chamber.

16. In a pressure and temperature regulated mixing valve, a casing containing opposite passages respectively for hot fluid and cold fluid and each having an inlet port and an outlet port, a cylindrical mixing chamber supported for both rotative and axial movement in said casing between said passages, said mixing chamber having intake and exhaust openings, duct means providing communication between said passage outlet ports and the mixing chamber intake port, valve means connected with said mixing chamber and including openings of which quadrant sections are normally respectively in overlapping relation with quadrant sections of said ports so that rotation of the mixing chamber in one direction decreases the amount of such overlap with the ports in the hot fluid passage and increases the amount of such overlap with the ports in the cold fluid passage whereas rotation of said chamber in the opposite direction increases the amount of such overlap with the ports in the hot fluid passage and decreases the amount of such overlap with the ports in the cold fluid passage and that such axial movement in one direction decreases the amount of such overlap with the ports in the hot fluid passage and increases the amount of such overlap with the ports in the cold fluid passage whereas such axial movement in the opposite direction increases the amount of such overlap with the ports in the hot fluid passage and decreases the amount of such overlap with the ports in the cold fluid passage, a force reaction member in said mixing chamber, a thermostatic element in said mixing chamber and connected between said reaction member and said chamber, said thermostatic element being operable when subjected to fluid of increased temperature to rotate said chamber in said one direction while reacting against said reaction member and similarly operable when subjected to fluid of decreased temperature to rotate said chamber in the opposite direction, said chamber also having end sections respectively disposed for subjection to the pressure of fluid in said passages and being thus movable under control of such fluid in said one axial direction upon a relative increase of fluid pressure in the hot fluid passage and movable in the opposite axial direction upon a relative decrease of fluid pressure in said hot fluid passage.

17. In apparatus including a passage for delivering from a fluctuatable pressure source a fluid at a rate substantially independently of the fluctuations in said pressure and under conditions when the delivery rate is too slow for the fluid to create a significant back pressure at the point of issuance from said passage, the combination of valve means operable to control both the admittance and discharge of the fluid into and from an intermediate portion of said passage whereby the pressure of the fluid therein can be regulated by relatively adjusting the admittance and discharge capacities thereof, and valve operating means responsive to changes in pressure of the fluid in said passage portion and thus being operable upon a change in said pressure to actuate said valve means to effect an inverse change in both the admittance and discharge capacities of said passage portion to vary the resistance to the flow of fluid through the passage generally inversely to the pressure at said source and while effecting such change to a lesser degree in the discharge capacity to stabilize the control of said valve operating means.

18. In a valve structure for controlling the flow and mixture of fluids of different character, fluid conducting passages respectively for said fluids, each of said passages having an inlet port and an exhaust port, valve parts respectively associated with said ports and relatively movable with respect thereto to regulate their flow capacity, the regulating effect of the parts associated with the inlet ports being greater than that of those associated with the outlet ports, pressure responsive actuating means operably connected with said valve parts to effect the regulatory movement thereof, said actuating means being responsive to the pressure in each of said passages and operable upon a relative increase in pressure in either passage to decrease the flow capacity of the ports associated therewith and to simultaneously increase the flow capacity of the ports associated with the other passage.

19. In a valve containing a passage for delivery of a fluid that is susceptible to variation in pressure, valve means operable to control both the admittance and discharge of the fluid into and from an intermediate portion of said passage whereby the pressure of fluid in said passage portion can be regulated by adjusting the admittance and discharge capacities thereof, and valve operating means responsive to the pressure in said passage portion and being thus operable to change both the admittance and discharge capacities thereof as an inverse function of a change in pressure therein to vary the resistance of such passage to the flow of fluid therethrough generally inversely to the change of pressure therein, and said valve means also being operable in effecting such change in the admittance and discharge capacities of said passage portion to vary the pressure therein as a direct function respectively of the increase or decrease in its admittance and discharge capacities to stabilize the control of the pressure responsive valve operating means.

20. In a valve structure for controlling the flow and mixture of fluids of different character, fluid conducting passages respectively for said fluids, valve means operable to control both the admittance and discharge of the fluid into and from intermediate portions of said passages whereby the pressure in each intermediate passage portion can be regulated by adjusting the admittance and discharge capacities thereof, and valve operating means responsive to the relative pressure in said passage portions and thus being operable to change the admittance and discharge capacities of each passage portion as an inverse function of a relative change of the pressure therein with respect to the other passage portion to vary the resistance of each passage to the flow of fluid therethrough generally inversely to the relative change of pressure therein, and said valve means also being operable in effecting such changes in the admittance and discharge capacities of each passage to vary the pressure therein as a direct function respectively of the increase or decrease in its admittance and discharge capacities to stabilize the control of the pressure responsive valve operating means.

21. In a valve containing a passage for delivery of a fluid from a source that is susceptible to variation in pressure and having inlet and discharge ports for said passage, adjustable valve means having an inlet opening normally in overlapping relation with said inlet port and a discharge opening normally in overlapping relation with said discharge port, pressure responsive valve control means responsive to the pressure of fluid in said passage and operable to adjust said valve means to change the amount of overlap of said openings with their respective ports inversely with respect to a change in such pressure, and said ports and openings being of such relative contour that the overlap of the discharge port and opening incurs less change than that of the inlet port and opening pursuant to said adjustment.

22. In a valve structure for controlling the flow and mixture of fluids of different temperature, a mixing chamber for said fluids, a fluid conducting passage for directing one of said fluids into said mixing chamber and having an inlet port and an exhaust port, a rotatable and axially adjustable valve member including parts respectively associated with said ports for regulating their flow capacity, said parts being effective to respectively increase and decrease the flow capacity of said ports when said member is rotatively adjusted in opposite directions and also to respectively increase and decrease such flow capacity when said member is axially adjusted in opposite directions, means responsive to the pressure in said passage to effect one character of the aforesaid adjustments to said valve member for changing the flow capacity of said ports inversely with a change of pressure in said passage, and means responsive to the temperature of the fluids mixed in said chamber to effect the other character of aforesaid adjustments to said valve member in accordance with a temperature change in such mixed fluid, and the regulating effect of the part associated with the inlet port being greater than that associated with the exhaust port pursuant to the adjustment under control of the pressure responsive means.

23. In a valve structure for controlling the flow and mixture of fluids of different temperature, a mixing chamber for said fluids, opposite fluid conducting passages for directing respective of said fluids into said chamber and each having an inlet port and an exhaust port, rotatable and axially adjustable valve means including parts respectively associated with said ports for regulating their flow capacity, said valve means when adjusted rotatively in one direction being actuative of said parts to decrease the flow capacity of the ports in one passage while increasing the flow capacity of the ports in the other passage, and when rotated in the opposite direction being actuative of said parts to respectively increase and decrease the flow capacity of the ports in said one and other passages, said valve means when adjusted axially in one direction being actuative of said parts to respectively increase and decrease the flow capacity of the ports in said one and other passages and when adjusted axially in the other direction being actuative of said parts to respectively decrease and increase the flow capacity of the ports in said one and other passages, temperature responsive means operable to rotatively adjust said valve means in the direction to cause variation in the flow capacity of the hot water passage ports inversely with temperature changes of fluid mixed in said chamber, and means responsive to changes in the relative pressure in said passages to axially adjust said valve means in the direction to decrease the flow capacity of the ports pertaining to the passage wherein a relatively increased pressure occurs, and the regulating effect of the valve parts associated with the exhaust ports being less than that of the valve parts associated with the inlet ports pursuant to said axial adjustment.

24. In a pressure and temperature regulated mixing valve, a casing containing a passage having an inlet port and an outlet port, a cylindrical mixing chamber supported for both rotative and axial adjustment in said casing, said mixing chamber having intake and exhaust openings and being communicative with said outlet port through said intake opening, valve parts respectively associated with said ports for regulating their flow capacity and connected with said mixing chamber for regulation in accordance with the adjustment thereof, said valve parts being effective to respectively increase and decrease the flow capacity of said ports when the mixing chamber is rotatively adjusted in opposite directions and also to respectively increase and decrease such flow capacity when said chamber is axially adjusted in opposite directions and the regulating effect of the flow capacity of the inlet port being greater than that of the outlet port pursuant to such axial adjustment, manually adjustable force reaction means in the mixing chamber, a thermostatic element in said chamber and connected between said chamber and said force reaction means to provide a mechanical connection through which said chamber can be manually rotatively adjusted, said thermostatic element being operable when subjected to fluid of changed temperature to rotatively adjust said chamber in the direction for regulating the flow capacity of said ports so the volume of fluid passed thereby will be changed to counteract such temperature change, said chamber also being subjected to the pressure of fluid in said passage to result in axial adjustment thereof upon a change of such pressure and in the direction for regulating the flow capacity of said ports inversely with respect to said pressure change.

LE ROY N. HERMANN.